STORING AND RECALLING SIGNALS

Filed Dec. 7, 1961 4 Sheets-Sheet 1

INVENTORS:
NOYES D. SMITH, JR.
WILLIAM L. ROEVER
BY: Oswald H. Milmore
THEIR ATTORNEY

STORING AND RECALLING SIGNALS

Filed Dec. 7, 1961

INVENTORS:
NOYES D. SMITH, JR.
WILLIAM L. ROEVER
BY: Oswald H. Milmore
THEIR ATTORNEY INVENTORS:
NOYES D. SMITH, JR.
WILLIAM L. ROEVER
BY: Oswald H. Milmore
THEIR ATTORNEY INVENTORS:
NOYES D. SMITH, JR.
WILLIAM L. ROEVER
BY: Oswald H. Milmore
THEIR ATTORNEY United States Patent Office 3,320,596
Patented May 16, 1967

3,320,596
STORING AND RECALLING SIGNALS
Noyes D. Smith, Jr., and William L. Roever, Bellaire, Tex., assignors to Shell Oil Company, New York, N.Y., a corporation of Delaware
Filed Dec. 7, 1961, Ser. No. 157,796
15 Claims. (Cl. 340—174)

This invention relates to the storage and recall of information which includes signal elements forming a sequence in time. More particularly, it is concerned with a method and a device for accumulating within a storage body a series of signal elements which vary in amplitude as a function of time, sometimes called the analogue storage of information as distinguished from digital storage, and is further concerned with the recall of the information at will. The invention is applicable to computer circuitry, telephone circuitry, servo-mechanisms, data-storage systems, and the like. It may be noted that although the invention in itself deals with the analogue storage of information it may be applied as a component of or in conjunction with a digital computer or system.

It is known to store a sequence of pulses transiently in rods or elongate bodies of magneto-strictive materials for the purpose of achieving a time-delay. (See U.S. Patents, No. 2,495,740 to Labin et al., Jan. 31, 1950, and No. 2,846,666 to Epstein et al., Aug. 5, 1958.) The signal is applied to the rod magnetically and creates a mechanical disturbance which travels along the rod, setting up corresponding magnetic fields at one or more points displaced from the point of application; the variation in the magnetic field is detected at such displaced point as a delayed signal. The mechanical disturbances are dissipated and are not, therefore, stored within the rod so as to be subject to recall at will.

It is an object of this invention to provide a memory device and a method of storing information expressed as an amplitude which is a function of time wherein the information can be recalled at will. The said information may be a continuous function of time or may be a sequence of pulses of like or different amplitudes with equal or non-equal time intervals between them.

A further object is to provide a device and a method of recalling or reading out the information after storage according to the above object. A specific object is to effect recall of the information substantially non-destructively, so that it may be recalled repetitively without restorage thereof after read-out. An ancillary object is to effect read-out of the stored information either in the normal or reverse order as the source signal. A further ancillary object is to effect read-out of the stored information on the same time-scale as the source signal or on a different time-scale.

In accordance with the invention use is made of an elongate body, such as a solid or tubular rod, having the properties of being polarized by the application of a polarizing stress, of retaining a remanent polarization after removal of the polarizing stress and of exhibiting a coupling between its polarization and mechanical stress and strain. Such properties occur in magneto-strictive materials and electro-strictive materials. For convenience this class of materials is herein sometimes referred to as electro-magneto-strictive materials.

In summary, according to the invention the source train of signal elements is applied as a series of mechanical stresses—if necessary, after transformation or amplification by a suitable transducer—to an input point of an elongate, electro-magneto-strictive body, preferably after polarizing the said body, to produce mechanical stresses which travel along the length of the body as longitudinal or torsional waves, and applying a short polarizing stress to the body before the stress wave reaches the end of the body. The application of the short polarizing stress produces within the body a remanent polarization in which the magnitude at various points along the length of the body corresponds to the magnitudes of the mechanical stresses at those points at the instant that the short polarizing stress was applied. Hence the remanent mechanical stresses at spatially displaced points are fixed or "frozen" at values which correspond to the amplitudes of successive elements of the source signal which were applied at successive times.

The term "short" as used herein denotes a duration which is small in relation to the duration of the elements of the signal. After the stress wave due to the source signal has become dissipated, the remanent polarization will be different from that at the instant of the application of the short polarizing pulse but nevertheless a function of the stress at that instant. Corresponding to these remanent polarizations, there are remanent mechanical strains. Thus, the information is stored in the material, which acts as a memory device.

According to a second feature of the invention the stored information is recalled by propagating a mechanical stress through the body and observing the effect of the stress during such propagation as a function of time. This may be effected in various ways:

(1) According to one method a single, short acoustic recall pulse is initiated in the body; as this pulse travels the length of the body it changes the stress and, hence, the remanent polarization successively along the spatially displaced points along the rod. This change in remanent polarization is observed as a function of time and the information is thereby recalled. In the usual case the recall pulse is applied at or near the end of the body toward which the source wave travelled during storage thereof; the elements of information are then read off in the same time-sequence as in the source signal; one may, however, recall the information elements in reverse order by applying the recall pulse to travel along the body in the same direction as the source signal, e.g., by applying it to the other end or the point of application of the source signal.

(2) According to a second method the polarization is changed simultaneously all along the length of the body. This generates new mechanical stresses along the body which have magnitudes corresponding to the remanent stresses and polarizations, and these new stresses travel along the body as waves in both directions. These stress waves are observed by a transducer at or near one end of the body—usually at the end remote from the point of application of the source signal to reconstitute the original information in its normal sequence; however, the waves may be observed at the other end for reversing the sequence.

The recall of information is substantially non-destructive, whereby it is possible to interrogate the storage device repetitively and at will.

The mechanical stresses used to feed the source signal to the elongate body and the stress used to recall the stored information may be longitudinal or torsional and may be of the same or of different forms. Because the velocity of propagation of longitudinal waves is different from that for torsional waves the time-scale of the recalled signal may be the same as, shorter, or longer than that of the source signal. Thus, the time-scale is unaltered when both the storage and recall stresses are longitudinal or when both are torsional; it is enlarged when the former is compressional and the latter torsional, i.e., the time-scale is increased, and the recalled signal will be expanded over a longer time period; and when the former is torsional and the latter compressional, the time-scale is decreased. However, it is preferred according to the invention, whenever the storage and recall waves are of the same type, to employ torsional stresses because it leads to reduced dispersion.

The invention will be described in detail with reference to the accompanying drawings forming a part of this specification, wherein.

Figure 1:
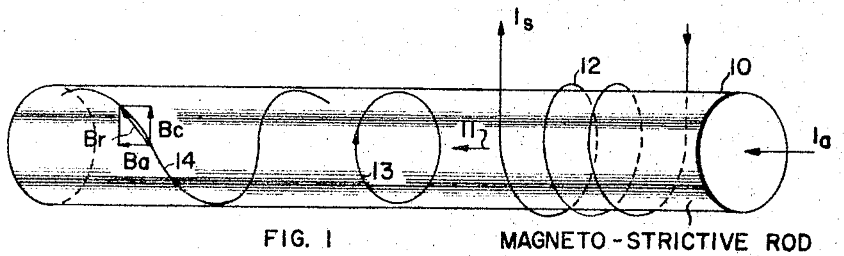
FIGURE 1 is a perspective view of a rod of magneto-strictive material, showing the magnetic fields discussed in the specification.
Figure 4:
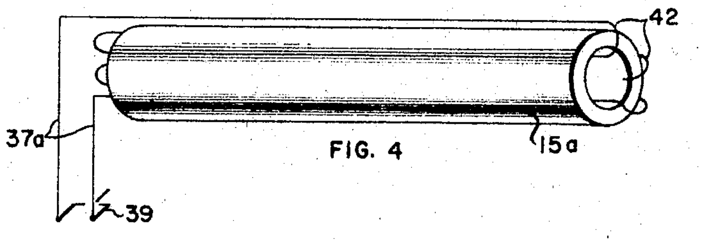
FIGURE 4 is a perspective view of a modified form of an electro-strictive memory rod suitable for use in the embodiment of FIGURE 2.

As a preliminary to a description of the invention reference is made to FIGURE 1 to explain the behaviour of electro-magneto-strictive materials. The rod 10 is of magneto-strictive material, such as nickel, a nickel alloy such as permalloy, or a ferrite. Ferrites are described by Robert L. Harvey in an article "Ferrites and Their Properties at Radio Frequencies" on pages 287–298 of vol. 9 of the Proceedings of the National Electronic Conference, 1953, and may, for example, be a material having the formula $NiO.Fe_2O_3$, containing a proportion of nickel to iron in the ratio of two to one atomic weights. If such a rod is placed in a magnetic field, a stress and resultant strain is produced in the material; materials exhibiting positive or negative magneto-striction tend to expand or contract, respectively, in the direction of magnetization. Conversely, when such a material is strained, the magnetization changes. These materials exhibit remanence in magnetization and strain, and to every state of remanent magnetization there is a corresponding remanent strain: if the magnetization is varied, the strain varies, and if the strain varies the magnetization varies. An axial magnetic field 11 can be applied to the rod 10 by passing a D.C. current $I_s$ through a solenoid 12 disposed coaxially therewith. A circumferential magnetic field 13 can be set up by passing an axial D.C. current $I_a$ along the rod (or through a toroidal coil such as is shown in FIGURE 4 at 42 when the rod has a central bore).

Consider first that the axial magnetic field 11 is applied and reduced to zero. Thereafter the circumferential field 13 is applied and reduced to zero. Corresponding to each of these fields there will be a remanent magnetization. The resultant of the remanent magnetizations is shown at 14, which is the vector sum of the remanent axial magnetization $B_a$ and the circumferential remanent magnetization $B_c$, $B_r$, the resultant, is a helical field about the rod.

It is a property of magneto-strictive materials that if either a circumferential or axial field is present alone, and a torsional stress is applied to the rod, a helical field is generated. If the rod has a state of helical magnetization, then a compressional wave in the rod will produce changes in this helical field. The amounts of the changes in the magnetic fields produced by various strains are related to the magnitudes and directions of the strains.

Let us suppose that the rod has only a remanent axial magnetization, $B_a$, and that a torsional stress is applied to one end of the rod. Then, if a circumferential magnetic field is applied and both the stress and the field are removed, there will be a helical remanent magnetization which is related to the magnitude of the torsional strain. Let us suppose that the rod has been given a uniform helical remanent magnetization $B_r$. Then, if a compressive stress along the length of the rod is applied, the state of magnetization will be changed and if a large magnetic field, either axial or circumferential, is applied and removed, the remanent magnetization after the compressive stress has been removed will be related to the size of the strain. These relationships are the physical basis for the invention.

Figure 2:
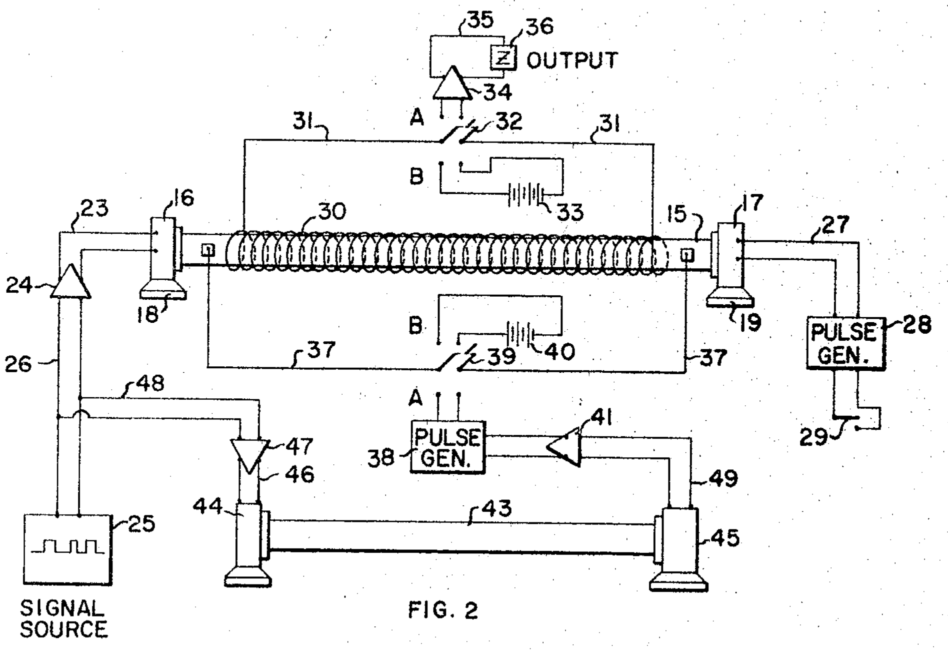
FIGURE 2 is a diagrammatic view of one embodiment of the invention, using a solid memory rod of magneto-strictive material, wherein recall is effected by applying a mechanical wave.
Figure 3:
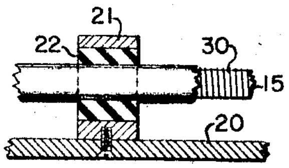
FIGURE 3 is a fragmentary detail view of a support at an intermediate section of the memory rod.

An embodiment according to the invention is shown in FIGURE 2. There is shown a memory rod 15 of magneto-strictive material having electro-mechanical transducers 16 and 17 fixed rigidly to the ends and electrically insulated therefrom. Transducer 16 is the signal-input transducer and 17 is used for applying a recall pulse. As was previously indicated, these transducers may be of the axial or torsional type, and the two transducers may be of the same type or different. In the embodiment under consideration both are torsional. In some constructions each transducer casing is anchored against rotation in a support 18 or 19; in others (FIG. 6) no anchor is used. Regardless of the transducer construction used, the rod is mounted for free torsional movement, e.g., unsupported between the ends thereof. Additional supports, if any, should be arranged to reduce acoustic coupling to the rod to a minimum. Moreover, with torsional transducers, axial acoustic coupling therefrom to the memory rod should be low. This can be achieved as is shown in FIGURE 3, wherein the rod 15 is supported from a base 20 by a ring 21 containing a sponge-rubber bushing 22. The input circuit 23 to the transducer 16 is connected to an amplifier 24 to which a source signal to be stored, e.g., from a source 25, is fed via a circuit 26. It should be understood that the signal may be but is not, in general, sinusoidal, but may take any form, such as a square wave (suggested in the drawing) including pulses which occur at equal or non-equal time intervals. The transducer 17 has its input circuit 27 connected to a pulse generator 28 which is controlled by a triggering device, represented by a switch 29. The generator emits, when triggered, single, short pulse of sufficient strength to impose a strong torsional stress from the transducer to the rod 15.

The rod 15 carries a helical winding 30 which is connected via a circuit 31 and a double-throw switch 32 either to a source 33 of direct current (when the switch is in its B-position) or to an output amplifier 34 (when the switch is in its A-position shown). The amplified signal is taken off via a circuit 35 to a load 36. When the switch is in its B-position the solenoid is effective to create an axial magnetic field.

The rod 15 is further provided with means for creating circumferential magnetic field. This may be a circuit 37 connected to the ends of the rod for transmitting a strong direct current pulse therethrough and connected to a pulse generator 38, preferably through a double-throw switch 39. This connection is established when the switch is in its A-position. When in its B-position the circuit 37 can be connected to a source 40 of direct current. The generator 38 is controlled by an amplifier 41.

It will be understood that other means for creating a circumferential magnetic field may be used. For example, as is shown in FIGURE 4, the rod 15*a* may be tubular and be provided with a toroidal winding 42 and connected to a circuit 37*a* to the switch 39. The other elements attached to the rod are omitted from FIGURE 4 for clarity but would be present as previously described.

A delay element of any suitable design is provided between the signal source 25 and the amplifier 41. In the illustrative embodiment it includes a delay rod 43, which may be constructed like the rod 15 and be of like material but of such length that a stress wave can travel along it before a simultaneously applied stress can travel the full length of the rod 15. The rod 43 of course need not be of magneto-strictive material. This rod is fixed to an electro-mechanical input transducer 44 at one end and a mechanical-electrical output transducer 45 at the other end, both being of the same type and anchored. It is evident that when the transducers 16 and 44 are of the same type, e.g., both torsional, the rod 43 must be shorter than the rod 15. The input circuit 46 of the input transducer is connected to the output side of an amplifier 47 which is connected via a circuit 48 in shunt to the source signal circuit 26, and the output circuit 49 of the transducer 45 is connected to the amplifier 41.

In operation, initially the switch 32 is placed in its B-position, thereby passing a direct current through the solenoid 30 and polarizing the rod 15 with axial magnetization. To store a signal the switch 39 is moved to its A-position and the switch 32 is opened. The remanent axial magnetization remains in the rod. The signal from the source 25 is thereafter applied simultaneously via the amplifiers 24 and 47 to the transducers 16 and 44 of the memory rod 15 and the delay rod 43, respectively. Torsional waves progress along both of the rods, with amplitudes along the rods corresponding to the successive elements of the signal. The torsional wave in the delay rod reaches the transducer 45 before the other wave reaches the end of the memory rod. The first element of the signal is amplified in the amplifier 41 to trigger the pulse generator 38 to transmit a sharp electrical pulse of direct current through the memory rod via the circuit 37. This applies a short polarizing stress simultaneously throughout the length of the rod by imposing circumferential magnetizing field. When this pulse is ended the elements of the signal are stored along the memory rod as remanent magnetizations and remanent strains.

When a tubular rod such as appears in FIGURE 4 is used the polarizing pulse is created by flowing the direct current through the winding 42 from the circuit 37*a*, thereby creating a similar momentary circumferential magnetizing field.

To recall the information, the switch 32 is moved to its A-position to connect the solenoid 30 to the amplifier 34; the switch 39 may be open or left in its A-position. The control device 29 is actuated to trigger the pulse generator 28 and apply a sharp electrical pulse to the transducer 17 at the end of the memory rod. A single torsional wave travels along the rod and influences the spatially separated sections thereof in succession, producing a succession of changes in magnetic field which are proportional to the remanent magnetizations and, hence, to the amplitudes of the original signal elements. The effect of this propagated stress is observed by means of the solenoid 30, the induced E.M.F. from which is amplified in the amplifier 34. The original signal is reproduced in the circuit 35 and load 36. The stored signal can be recalled in this manner as many times as desired without destroying it.

When it is desired to clear the memory, the rod must be demagnetized. This can be accomplished in various ways, for example, by placing an oscillating field in the solenoid 30 and gradually reducing the amplitude of the field to zero, or by passing a sufficiently large current through the rod 15 to raise its temperature above the Curie temperature.

Figure 5:
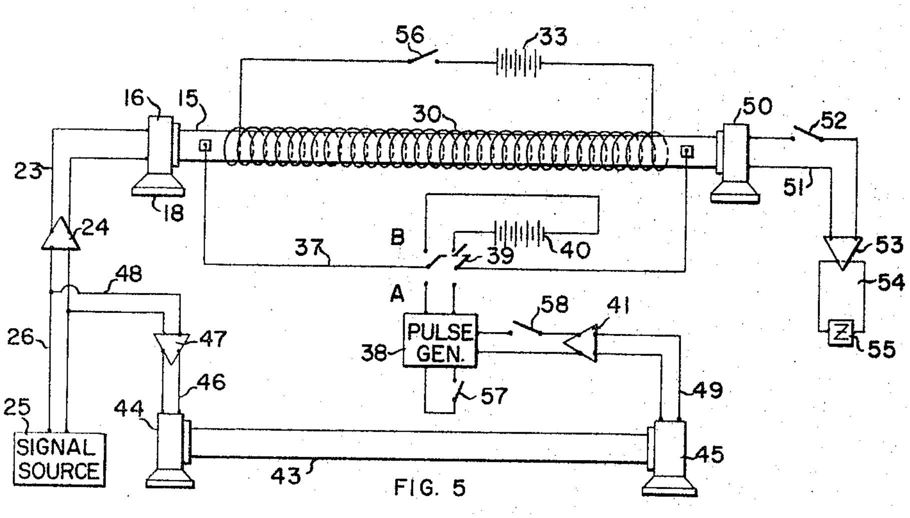
FIGURE 5 is a diagrammatic view of a modified arrangement for recalling the stored information, which involves changing the polarization simultaneously along the electro-strictive memory rod to propagate stress waves therein.

According to an alternative method of recalling the signal, the polarization is changed along the length of the rod 15 and the resultant mechanical waves are detected. For this purpose the device may be modified as is shown in FIGURE 5, wherein a torsional mechanical-electrical transducer 50 replaces the electro-mechanical transducer 17. The output circuit 51 from this transducer is connected via a switch 52 to an output amplifier 53, having an output circuit 54 connected to a load 55. The solenoid 30 is connected, as before, to a source of direct current 33, but the control switch 56 is, in this case, of the single-throw type. The pulse generator 38 is provided with a control element, represented by a switch 57, and the circuit from the amplifier 41 is preferably provided with a switch 58. It is evident that the elements 53–57 correspond to elements 34–36, 32 and 29, respectively. Other elements are the same as in the previous embodiment.

The device of FIGURE 5 is used as previously described to store a signal. To recall a signal the switch 39 is placed in its A-position, the switch 52 is closed, the switch 56 is open, and the switch 58, when provided, is open. The control 57 is operated to trigger the generator 38, thereby sending a short, strong pulse of direct current through the memory rod. This changes the polarization simultaneously along the length of the rod and generates new torsional stresses at different points having magnitudes corresponding to the remanent magnetizations at those points. These stresses travel in both directions as torsional and compressional waves. Both trains reach the transducer 50 which, however, is sensitive only to one type—the torsional waves in the embodiment described. This transducer therefore generates electrical signals corresponding to the torsional waves, which are amplified at 53. The original signal (assuming that the transducer 16 was also of the torsional type) is reproduced without change in time-scale in the circuit 54 and load 55.

The system of FIGURE 5 can also operate without change in time-scale when the transducer 16 is of the compressional type and the transducer 50 is sensitive only to compressional waves. However, when the transducer 16 generates compressional waves in the storage cycle and the transducer 50 is sensitive only to torsional waves the reproduced signal will have its time-scale lengthened. Conversely, when the transducer 16 generates torsional waves and compressional waves are detected by the transducer 50 the time-scale in the reproduced signal is reduced.

Although not illustrated, it will be understood that the input and output circuits can be provided with suitable circuit elements such as gating arrangements for permitting only the desired signal to be transmitted; this may be included in the amplifier units. It may be further noted that mechanical stress waves which reach the ends of the rods are reflected but eventually die out. Thus, in recording the signal it is the condition in the memory rod at the instant that the polarizing pulse is emitted by the pulse generator 38 that determines what is recorded, and subsequent waves do not alter the stored information. During recall, a gating arrangement in the amplifier 34 or 53 or associated with the input or output of such amplifier prevents signals due to reflected waves from being included in the output. Because such gating arrangements are well known in themselves, no description of them is included.

The time duration of the signal which can be stored in this system depends upon the length of the rod and the velocity of the stress wave through the rod; the latter, in turn, depends upon the nature of the wave. The velocity of compressional waves in a thin nickel rod is 5100 meters per second, and a torsional wave is propagated with a velocity of 3200 meters per second.

Because of this difference in the velocities of propagation it is possible, as previously noted, to store the signal by one type of wave and recall it by another, e.g., in the case of FIGURE 1, record it by a compressional wave (the transducers 16, 44 and 45 being in this case of the compressional type) and recall it by a torsional wave (the transducer 17 being of the torsional type). By this method the time scale of the signal is increased by the ratio of the velocity of compressional waves to the velocity of the torsional waves. This decrease in the frequency band used by the signal is important when it is desired to transmit the signal over a cable, as from a logging instrument situated in a well some distance beneath the surface. In other words, the device according to the invention can be mounted at a transmitting station and used for the purpose of increasing the duration of a signal, whereby the signal is less subject to attenuation and/or less costly transmission cables can be employed.

The device can also be used to decrease the duration of the signal and increase the frequency of the source signal by storing the signal by means of a torsional wave and recalling it by means of a compressional wave (the transducer 17 of FIGURE 1 being in this case of the compressional type and the transducers 16, 44 and 45 of the torsional type). This arrangement would be useful in connection with electronic computers when the computation speed is greater than the speed at which information is available in the original signal source.

In describing the methods of this invention the fidelity with which the information containing signal can be stored and recalled was not discussed in order to simplify the description of the basic operation of storage and recall. Two important sources of distortion are dispersion of the elastic waves and the non-linearity of the relationships between mechanical stress, magnetomotive force and magnetization.

Longitudinal elastic waves travelling in a rod are dispersed, i.e., the velocity of the waves is a function of their wavelength. The velocity of the short wavelengths is greater than the velocity of the longer wavelength waves and consequently a signal made up of waves of different wavelengths becomes distorted as it propagates along the rod. This effect can be minimized by keeping the wavelengths of interest much longer than the radius of the rod. For example, a signal of 100 kilocycles per second will have a wavelength in a nickel rod of approximately 5 centimeters. Thus if the radius of the rod is 1 millimeter, very little dispersion will take place. Torsional waves in a rod are not dispersive, i.e., the velocity is essentially independent of the wavelength. Hence the use of torsional waves is preferred particularly for storing and recalling signals with a very short wavelength.

The distortion due to nonlinearity can be minimized by modulating a carrier wave. Amplitude modulation can be used with the amplitude of the carrier wave chosen so that amplitude variations of the signal occur about a point on the most linear portion of the function relating magnetization to strain and magnetomotive force. For example a carrier wave with a frequency of 50 kilocycles per second may be modulated by a signal covering a range of frequencies up to 10 or 20 kilocycles per second.

Frequency modulation can be used with an amplitude limiter to essentially eliminate distortion due to nonlinearity. The amplitude is chosen so as to use that portion of the function relating magnetization to strain and magnetomotive force which produces the maximum response and thus the best signal-to-noise ratio. For example, a central carrier with a frequency of 500 kilocycles per second may be used with a modulating frequency of 20 kilocycles. Because such modulating and demodulating systems are well known and would be incorporated into the signal source 25 and the output signal amplifier 34 or 53, they are not further described herein.

Figure 6:
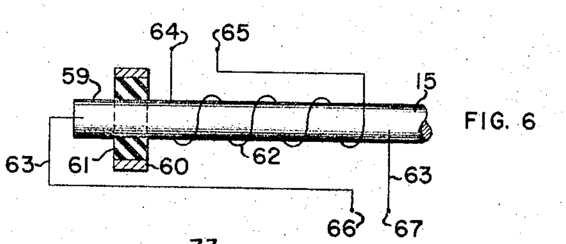
FIGURE 6 is an elevation view of a magneto-strictive transducer applied to one end of a memory rod.

A specific example of a transducer is a magneto-strictive transducer, which is shown in FIGURE 6 but not restrictive of the invention. It includes a rod 59 of magneto-strictive material which is connected to (or may be integral with and be the end section of) the magneto-strictive memory rod 15. It may also be applied to the electro-strictive memory rod to be described with reference to FIGURES 9–13. It is mounted within a support ring 60 by a foam rubber bushing 61 and forms the core of a solenoid 62, for creating an axial magnetic field. A circumferential magnetic field can be produced by passing an axial current through the rod via a circuit 63. For torsional waves a source of direct current is connected to the terminals 64, 65 of the solenoid. This current may be left on during operation of the transducer, or only the remanent polarization can be used. The input signal is applied to the terminals 66, 77, which produces a circumferential magnetic field and twists the rod to produce torsional stresses corresponding to the elements of the signal.

For compressional waves, the terminals 64 and 65 are used to pass a direct current and thereby produce remanent axial magnetization. These terminals are then connected to the signal source; the varying axial magnetization produces compressional waves.

When used as a transducer for converting torsional waves into electrical pulses, e.g., as in the case of the transducers 45 and 50, a direct current is applied to the terminals 66 and 67, and the waves produce magnetic fields in the solenoid 62, the terminals 64 and 65 then acting as the output terminals. When the transducer is to be sensitive to compressional waves, a direct current is passed through the solenoid 62 through terminals 64 and 65 to produce an axial remanent magnetization in the rod. The same terminals 64 and 65 are then used as the output terminals (via suitable D.C. blocking elements) to detect a voltage produced in coil 62 by the passage of a compressional wave through the portion of the rod covered by solenoid 62.

It will be understood that when the rod 59 lacks sufficient inertia it may be restrained mechanically to improve the transmission of stress waves into or from the rod 15. This involves matching the impedance; however, an accurate match is not essential.

Instead of using magneto-strictive material, electro-strictive materials may be used for the memory rod. These materials are members of the class of ferroelectric materials, and may be distinguished from piezoelectric materials, in that in the latter a reversal of the voltage reverses the sign of the resulting strain, whereas for the electro-strictive materials the strain is an even function of the applied voltage and the strain does not reverse sign when the voltage is reversed. The three principal types of ferroelectric crystals that may be used are the Rochelle salt type, the potassium dihydrogen phosphate type, and the barium titanate type. These are described by Mason in the book, "Piezoelectric Crystals and Their Application to Ultrasonics," 1950 (D. Van Nostrand Company, Inc.), page 1 and chapters XI and XII. Of these a ceramic composed principally of fused, powdered barium titanate is of particular interest. It has a very high dielectric constant—of the order of 1500—and can be permanently polarized by applying a transverse voltage, e.g., of the order of 20,000 volts per centimeter while the ceramic is above its Curie temperature, cooling it to room temperature, and thereafter removing the voltage. Polarization of such material is described by Mason in U.S. Patent No. 2,742,614, Apr. 17, 1956.

Figure 7:
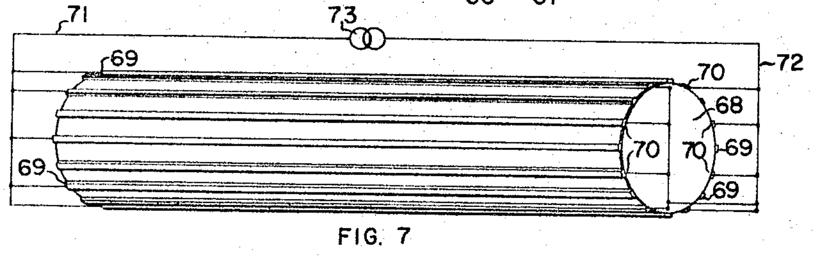
FIGURES 7 and 8 are perspective views of rods of electro-strictive material, illustrating the method of applying circumferential and helical polarizations, respectively.

To apply circumferential polarization to such a ferroelectric material, parallel line electrodes may be applied to the surface as is shown in FIGURE 7. Here the rod 68, e.g., of ceramic containing between 80 and 95% barium titanate, has a plurality of thin metallic electrodes 69, 70 in engagement with the rod parallel to the central axis. The electrodes 69 are connected to a common circuit 71 and the alternate electrodes 70 to a common circuit 72. A direct current voltage from a source 73 is connected to these circuits while the rod is heated to the Curie point and cooled. When a torsional strain is applied to the polarized rod a helical polarization results.

Figure 8:
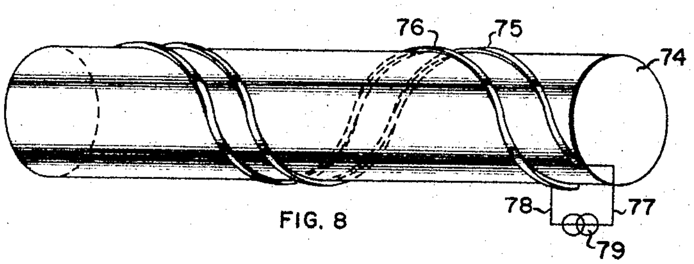

However, if the rod is to respond to both torsional and compressional strains, it is necessary to apply helical polarization to the rod. This is shown in FIGURE 8, wherein the rod is engaged by thin metallic electrodes 75, 76, which extend helically about the rod and are connected by circuits 77, 78 to a source 79 of direct current potential. Although only one pair of electrodes is shown, a greater number may be used, as indicated in FIGURE 7, to cover substantially the entire surface of the rod.

Figure 9:
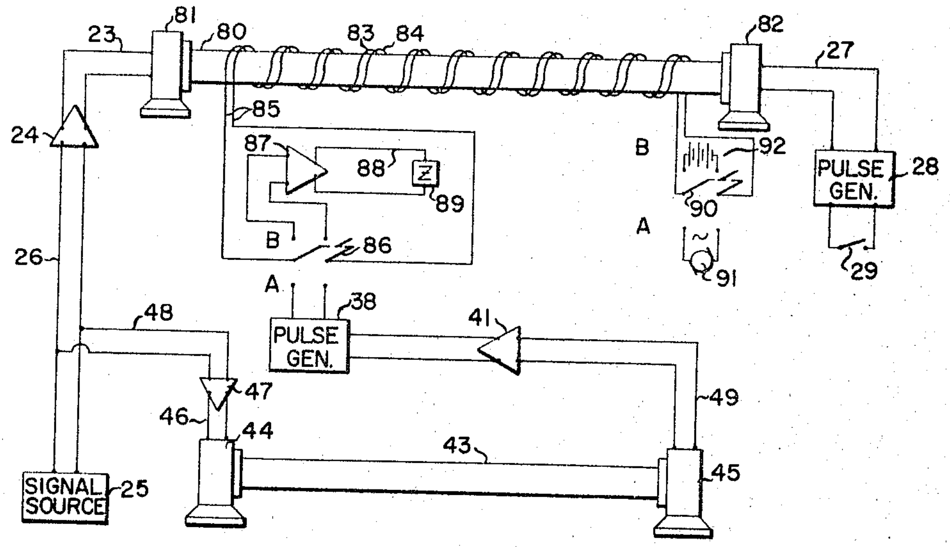
FIGURE 9 is a diagrammatic view of another embodiment of the invention wherein a memory rod of electro-strictive material is used, and recall is similar to the system of FIGURE 1.

An embodiment of the invention employing such an electro-strictive memory rod is shown in FIGURE 9, wherein the ferroelectric rod 80 has its ends mounted in transducers 81 and 82, the input circuits 23 and 27 of which are connected to elements 24–26 and 28–29, which are as previously described for FIGURE 1. The rod has one or more pairs of helical electrodes 83, 84 connected by a circuit 85 to a double-throw switch 86 which, when in its A-position, connects the circuit 85 to the pulse generator 38. Parts 38 and 41–49 are as previously described. The transducers 44, 45, 81 and 82 may be either of the torsional or compressional type, as was explained previously. When the switch is in its B-position the electrodes are connected to an output amplifier 87. The amplified output signal is taken off via a circuit 88 to a load 89. The electrodes are further connected to the poles of a switch 90 which may be a single-throw switch having at least the contacts indicated for the A-position by which the electrodes can be connected to a source 91 of alternating current the potential of which can be controlled. Optionally, the switch 90 is a double-throw switch, as shown, and includes further a B-position, in which the electrodes 83, 94 are connected to a source 92 of high direct current potential.

When the switch 90 is momentarily placed into its B-position, a remanent helical polarization is left in the rod 80. This operation, preliminary to storing a signal, is not always necessary; however, it is desirable to have an initial polarization to improve the sensitivity and the linearity of the storage system. The switch 90 is in open position while storing a signal.

To store a signal the switch 86 is placed in its A-position and the signal from the source 25 is applied simultaneously to the amplifiers 24 and 46 and, thence, to the transducers 81 and 44 to initiate torsional waves to the memory rod 80 and delay rod 43, which may be of the same type as the rod 80 or of other material. The signal wave reaches the transducer 45 before reaching the end of the rod 80, triggering the pulse generator 38 and applying a strong, short polarizing pulse of direct current voltage across the electrodes 83, 84. This imposes a helical polarizing field simultaneously along the length of the rod. Of course, when the short polarizing pulse of direct current is applied to electrodes 83 and 84, it is necessary to short out the switch 90 in order that the polarizing circuit may be completed. When this pulse is ended the elements of the signal are stored along the memory rod as remanent polarizations and remanent strains.

To recall the information the switch 86 is moved to the B-position and the control 29 is operated to apply a sharp torsional strain of short duration to the end of the rod 80 from the transducer 82. This wave travels along the rod, producing a succession of voltages between the electrodes 83 and 84 which voltages are proportional to the remanent strains and, hence, to the amplitudes of the original signal elements. These voltages are amplified in the amplifier 87, and the original signal is reproduced in the circuit 88 and load 89. As before, the stored signal can be recalled repetitively without destroying it.

To erase the signal from the memory rod the switch 86 is opened and the switch 90 is placed in its A-position to connect the electrodes to alternating current potential. This is gradually diminished, thereby depolarizing the rod 80.

Figure 10:
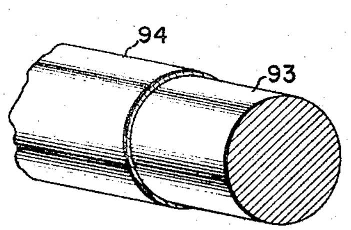
FIGURE 10 is a sectional perspective view of a modified form of memory rod wherein the magneto-electro-strictive material is applied as a coating.

Although certain specific embodiments of the use of magneto-strictive and electro-strictive rods were illustrated, it is evident that other physical arrangements may be used. For example, it is possible to bond a thin layer of either magneto-strictive or electro-strictive material to rods or wires of other materials which have different mechanical properties. This is shown in FIGURE 10, wherein a rod 93 of suitable structural material, such as steel, is coated with a layer 94 of magneto-strictive or electro-strictive material.

Figure 11:
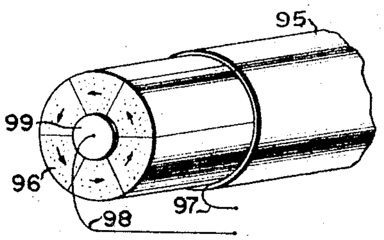
FIGURE 11 is a perspective view of an electro-strictive transducer applied to one end of a memory rod.

Electro-strictive material may also be used in the transducers. As is shown in FIGURE 11, a memory rod 95, which may be either magneto-strictive or electro-strictive, is fixed at the end thereof to a torsional wave transducer comprising a plurality, e.g., six pie-shaped sectors 96 of barium titanate or the like which have remanent polarizations in the directions tangential to the composite transducer, as indicated by the arrows. Each sector may be separately polarized or the sectors may be cut from a slab of material having remanent polarization and assembled in proper orientation. The flat ends of the composite transducer structure are provided with electrodes, e.g., by depositing a film of metal by vaporization on the ends and connecting the films to electrical connections 97 and 98, respectively, e.g., by one or more contact discs 99. The rod 95 can be attached to the metal-coated end of the transducer by an adhesive, e.g., an epoxy resin. The connections 97 and 98 are connected to the input circuit e.g., 23 or 46 of FIGURE 2. When the signal is applied to the electrodes each sector 96 is stressed in sheer parallel to the flat faces, thereby producing a torsional stress in the end of the memory rod 95. It is understood that the transducer may be mounted as is shown in FIGURE 6, it being preferred not to clamp it.

Figure 12:
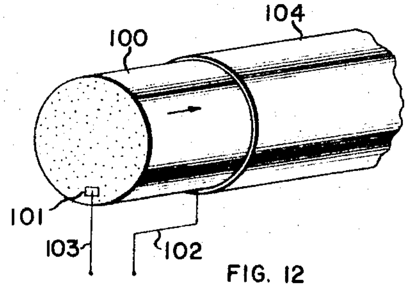
FIGURE 12 is a perspective view of a modified form of an electro-strictive transducer.

Another form of electro-strictive transducer, suitable for producing compressional waves, is shown in FIGURE 12. In this embodiment the transducer is a disc or rod 100 of electro-strictive material having remanent polarization in the direction parallel to the central axis, as indicated by the arrow, and similarly provided at its ends with electrodes 101 of any suitable type electrically connected to wires 102 and 103 which form the input circuit. The transducer is connected, as before, to a memory rod 104. When the signal is applied to the wires 102 and 103 longitudinal compressional waves are generated, which stress the end of the memory rod.

In connecting the transducer of FIGURES 6, 11 or 12 to the end of a rod, the efficiency with which the mechanical waves are generated depends upon the electromechanical impedance of the transducer and the manner in which it is coupled to the rod. The proper design of such transducers is well known and will not be further discussed.

Figure 13:
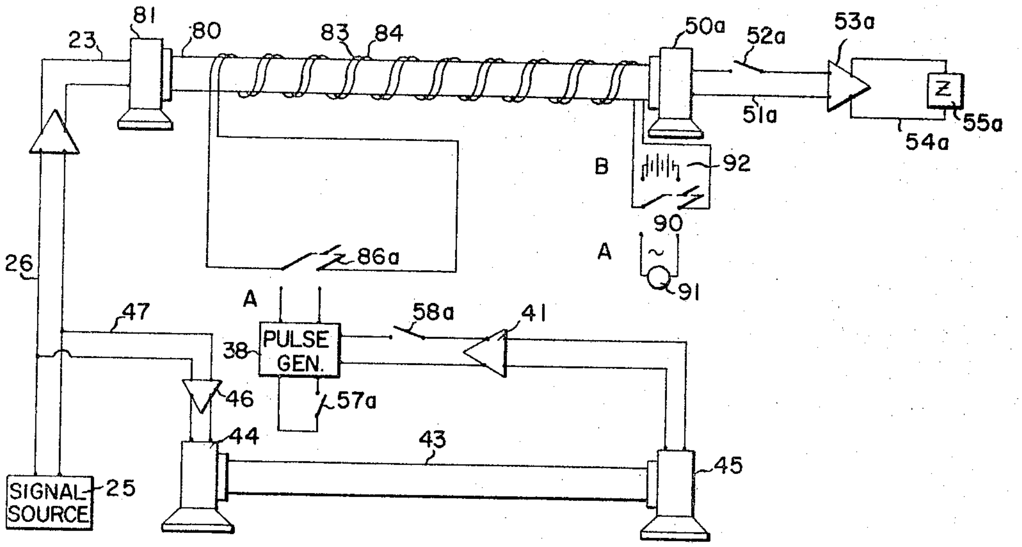
FIGURE 13 is a diagrammatic view of a further embodiment of the invention wherein a memory rod of electro-strictive material is used and the signal is recalled in a manner analogous to that of FIGURE 5.

FIGURE 13 shows an embodiment using an electro-strictive rod from which the signal is recalled in a manner that is completely analogous to that described for FIGURE 5. The device includes a ferroelectric memory rod 80 and all reference numbers smaller than 93 denote parts described for FIGURE 9. It will be noted that the switch 86*a* is of the single-throw type and that the amplifier 87 and associated elements are omitted; that the pulse generator 38 has a control element indicated by a switch 57*a*, for triggering it to emit a short, strong pulse; and that the pulse generator is connected to the amplifier 41 by a switch 58*a*. The transducer 82 of FIGURE 9 is replaced by a mechanical-electrical transducer 50*a*, the output circuit 51*a* of which is connected via a switch 52*a* to an amplifier 53*a*. The output of he latter is connected via a circuit 52*a* to a load 55*a*.

As was noted in connection with FIGURE 9, the switch is preferably placed momentarily in its B-position prior to storing a signal to place a remanent helical polarization into the rod, but this is not essential. The transducers may again be of the compressional or torsional types.

A signal is stored in the manner previously described for FIGURE 9, the switches 58*a* and 86*a* being closed and switch 90 open. The switch 90 must be short circuited when the short polarizing pulse is applied as explained above with respect to FIGURE 9.

To recall the signal, the switch 90 is left open, switch 52*a* is closed, and switch 58*a* is opened. The controller element 57*a* is operated to cause the pulse generator 38 to induce a short polarization pulse into the rod 80 via the electrodes 83, 84. This change in polarization generates trains of elastic waves which travel along the rod in both directions and including both torsional and compressional components. The signals propagated toward the transducer 50*a* are similar to the original signal waves while those moving toward the transducer 81 will have the original time-sequence reversed. When transducer 50*a* is sensitive to torsional waves only, only these waves will be detected to reproduce in the amplifier 53*a* and in its output circuit 52*a* and load 55*a* a train of corresponding signals. These will correspond to the time-scale of the original signal when the transducer 81 was likewise of the torsional type. The same is true when both transducers 81 and 50*a* are of the compressional type. However, when the former is of the torsional type and the latter of the compressional type, the time-scale will be shortened, while if these types are reversed the time-scale will be lengthened.

In discussiong the methods of this invention stress has been placed on the use of an initial helical polarization. This particular type of polarization is required if the information is stored using for example compressional waves and recovered by means of torsional waves. If only a single type of wave is to be used for storage and recall, it is not necessary to use any initial polarization. It may be desirable to use initial polarization to obtain a larger effect and thus improve the signal-to-noise ratio of the system.

We claim as our invention:

1. The method of storing a signal having an amplitude which varies with time which comprises:

(a) magnetically polarizing an elongate body of magneto-strictive material, said polarizing including an axial component;

(b) applying said signal as a series of mechanical signal stresses to said elongate body and propagating corresponding acoustic signal waves along the tength thereof; and (c) establishing a series of remanent stresses and polarizations along the length of said body corresponding to said signal waves within the body by applying thereto simultaneously at different points along the length of the body a short polarizing pulse during the said propagation of the signal waves, said polarizing pulse including a magnetic component that is orthogonal with respect to the first-mentioned polarization.

2. The method according to claim 1 wherein said mechanical stresses are applied torsionally.

3. The method according to claim 1 wherein said mechanical stresses are applied as longitudinal compression waves.

4. In combination with the steps as defined in claim 1, the steps of applying said signal to a delay element simultaneously with said application to said elongate body, and controlling the instant of application of said polarizing pulse in accordance with the output from said delay element.

5. The method of storing and recalling a signal having an amplitude which varies with time, which comprises the steps of (a) storing said signal as remanent stresses and polarizations in an elongate body by the steps defined in claim 1; and (b) subsequently recalling the stored signal by propagating a mechanical stress through said elongate body and observing the effect of said stress during the propagation thereof.

6. The method according to claim 5 wherein said signal is recalled by (a) applying a short mechanical recall stress to the body to propagate said wave along the length of said body; and (b) detecting the changes in magnetization along the length of the body as the pulse passes successive points in the body.

7. The method according to claim 6 wherein both the applied mechanical signal stresses and the applied recall stress are of the same type, whereby the propagated waves move at the same speed through said body and the time-scale of the detected changes is the same as that of the original signal.

8. The method according to claim 6 wherein one of said stresses applied torsionally and the other compressionally, whereby the time-scale of the detected changes is different from that of the original signal.

9. The method of storing a signal having an amplitude which varies with time and recalling said signal with an altered time-scale, which comprises the steps of:

(a) polarizing an elongate body of an electro-magneto-strictive material;

(b) applying said signal as a series of mechanical stresses to said polarized body and propagating corresponding acoustic signal waves along the length thereof;

(c) establishing a series of remanent stresses and polarizations along the length of said body corresponding to said signal waves by applying thereto simultaneously at different points along the length of the body a short polarizing pulse during the said propagation of the signal waves;

(d) subsequently applying a short mechanical recall stress to the rod and thereby propagating a corresponding wave along the length of said body, detecting the changes in polarization along the length of the body as the latter wave passes successive points in the body; and (e) reconstituting the signal by amplifying the detected changes;

(f) one of said stresses being torsional and the other being compressional, whereby said waves are propagated at different speeds.

10. A device for storing a signal having an amplitude which varies with time which comprises:

(a) an elongate body of an electro-magneto-strictive material having an intial polarization;

(b) an input element attached at a point of the elongate body for creating a series of mechanical signal stresses in said elongate body in response to an applied signal having an amplitude which varies with time to generate corresponding acoustic signal waves in said elongate body for propagation therealong;

(c) means for applying to said elongate body simultaneously along the length thereof a short polarizing pulse to establish a series of remanent stresses and polarizations along the length thereof corresponding to acoustic signal waves which occur within the elongate body at the instant that said polarizing pulse is applied;

(d) a time-delay element having an input and an output;

(e) means for applying said signal simultaneously to said elongate body and the input of the time-delay element; and (f) means responsive to the output of the time-delay element for initiating said polarizing pulse.

11. The combination defined in claim 10 wherein said input element and means for applying the recall stress are of different types, such that one applies a compressional stress and the other a torsional stress, whereby the time-scale of the detected changes in polarization is different from that of the applied signal.

12. Device for storing an electrical signal having an amplitude which varies with time, which comprises:

(a) a magnetically polarized bar of a magneto-strictive material;

(b) an electrical-mechanical transducer having the input connected to said signal and mechanically coupled to said bar for creating therein a series of mechanical signal stresses corresponding to said signal; and (c) means for applying to said bar simultaneously along the length thereof a magnetizing pulse having a magnetic vector component which is orthogonal to the magnetic vector of initial polarization of the bar, thereby to establish a series of remanent stresses and magnetizations along the length thereof corresponding to acoustic signal waves which occur within the bar at the instant that said magnetizing pulse is applied.

13. In combination with the device defined in claim 12, (a) means for recalling the signal from the bar which comprises means for applying to said bar a short mechanical stress, thereby to propagate an acoustic recall wave along the bar, and (b) means inductively coupled to said bar for detecting changes in magnetization of the bar as said recall wave passes successive points along the bar.

14. The combination defined in claim 13 wherein the means for applying the recall wave is a second transducer, one of said transducers being of the torsional type and the other of the compressional type, whereby the signal detected in said inductively coupled means has a time-scale which is different from that of the original signal.

15. In combination with the device defined in claim 12, means independent of the magnetizing means (c) for applying magnetic polarization to the bar prior to actuation of said electrical-mechanical transducer.

References Cited by the Examiner

UNITED STATES PATENTS

| | | | |
|---|---|---|---|
| 2,790,160 | 4/1957 | Millership | 340—173 |
| 3,016,524 | 1/1962 | Edmunds | 340—173 |
| 3,020,416 | 2/1962 | Van Vechten et al. | 340—173 |
| 3,127,578 | 3/1964 | Long | 340—174 X |
| 3,173,131 | 3/1965 | Perucca | 340—174 |

FOREIGN PATENTS

| | | |
|---|---|---|
| 873,367 | 7/1961 | Great Britain. |

JAMES W. MOFFITT, *Acting Primary Examiner.*

IRVING L. SRAGOW, BERNARD KONICK, *Examiners.*

M. S. GITTES, *Assistant Examiner.*